Dec. 8, 1964  E. J. FREY  3,160,698
MICROSCOPE AND DESK FIELD ILLUMINATOR
FOR VIEWING BROWNIAN MOVEMENTS
Filed July 31, 1961

INVENTOR
EDWARD J. FREY

BY Robert R. Cander
his ATTORNEY

United States Patent Office 3,160,698
Patented Dec. 8, 1964

3,160,698
MICROSCOPE AND DARK FIELD ILLUMINATOR
FOR VIEWING BROWNIAN MOVEMENTS
Edward J. Frey, 187 Marion Ave., Mansfield, Ohio
Filed July 31, 1961, Ser. No. 128,056
5 Claims. (Cl. 88—39)

This invention relates to a viewing device for observing the motion of particles under bombardment by the molecular motion of air.

The phenomena of molecular bombardment were first observed and recorded by Robert Brown, an English botanist, in 1827, and has since been called "Brownian movements" or "Brownian motion." Relatively few people have observed this phenomenon because of the rather special microscopic equipment required.

An object of my invention is to provide a compact, inexpensive and handy apparatus for viewing this most basic of all molecular phenomena.

Another object of my invention is to provide a new method of viewing this phenomenon.

Other objects become apparent from this description and from the accompanying drawings, in which.

Figure 1:
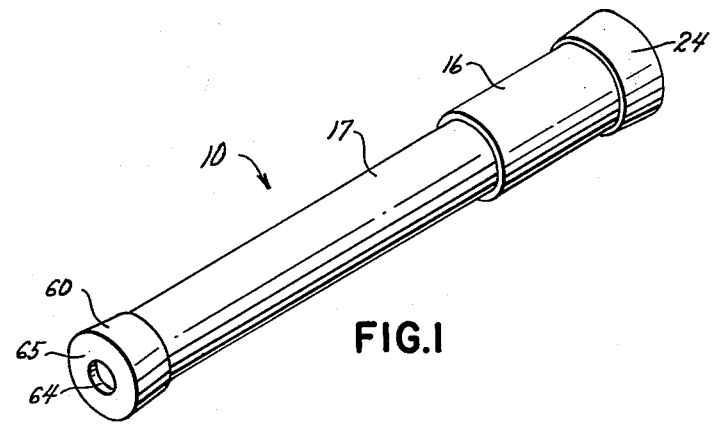
FIGURE 1 is a perspective view of my viewing apparatus.
Figure 2:
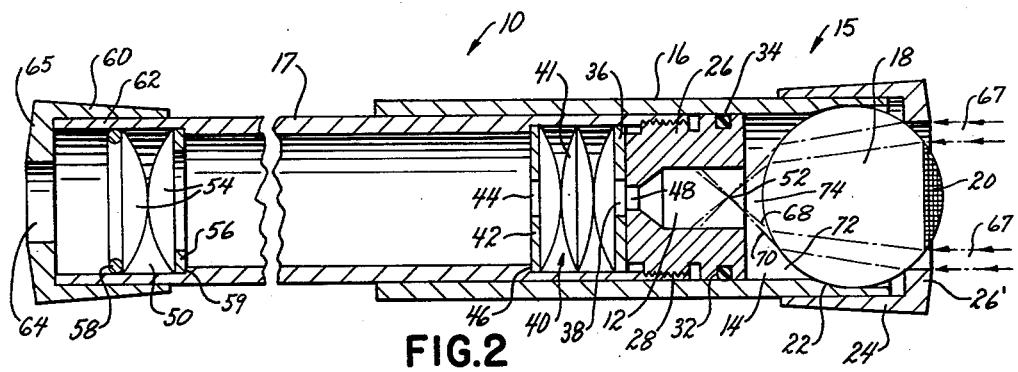
FIGURE 2 is a longitudinal cross-section of the apparatus, with portions broken away.
Figure 3:
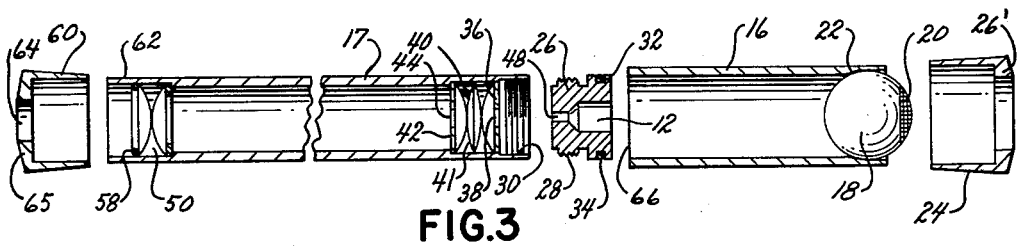
FIGURE 3 is a cross-sectional view, in reduced scale, of the apparatus shown in FIGURE 2, with the components partially assembled or disassembled.

According to this invention, a suitable medium power microscope 10, for example, may be constructed to provide an adjustable substantially sealed sample chamber 12, 14 at the objective end 15 of the microscope. This adjustable sealed chamber may be formed by a longitudinally adjustable tube 16 which telescopes with the main cylindrical body 17 of the microscope with an adjustable and sufficiently tight fit to maintain the chamber 12, 14 in substantially sealed condition.

The tube 16 may be longitudinally adjustable with respect to the cylindrical body 17 in any desired manner, such as by a longitudinal smooth sliding fit. Any other type of longitudinal adjustment of the tube 16 may be used, if desired, such as a relatively large pitch threaded fit and the like.

A relatively short focus condensing lens 18 is provided at the objective end 15 of the microscope, with the central portion of the lens 18 masked or blacked out at area 20 with paint or a relatively impermeable light shield. The lens 18 may be a transparent sphere of clear glass or plastic material. The pattern of area 20 may be circular, square or any other shape covering the central portion of the lens.

The lens 18 seats against the bevel surface 22 on the inner surface near the end of the tube 16. The fit is sufficiently tight to produce a substantial seal which is sufficient for the purposes of this invention.

A removable friction cap 24 surrounds the end of the tube 16 with a sufficiently tight fit to maintain the lens 18 against the bevel 22. The cap 24 may have an inward flange 26' to engage the surface of the lens 18 and to maintain the lens 18 against the bevel surface 22.

A plug 26 is provided with threads 28 which thread into the internally threaded end 30 of the main microscope body 17. This plug 26 also has the reduced diameter part 12 of the sample chamber 12, 14. A groove 32 is provided in plug 26 which receives the elastic ring 34 which produces a seal for the chamber 12, 14 between the plug 26 and tube 16.

The plug 26 presses against a washer 36 which has a viewing opening 38. The washer 36 presses against the microscope objective lens construction 40, which may be made of a plurality of suitable lenses 41. The objective lens construction 40 presses against a second washer 42 which has a viewing opening 44 and which engages the shoulder 46 on the inside of the main body 17.

The plug 26 has a viewing passageway 48 which is aligned with the viewing openings 38 and 44 of the washers 36 and 42 respectively. These form a microscope line of vision from the ocular lens construction 50 of the focal point 52 of the dark field of the condenser lens 18 elsewhere more fully described.

The ocular lens construction 50 may include a plurality of lenses 54 which engage the washer 56 at one end and are held in place by the snap ring 58 at the other end. The washer 56 engages the shoulder 59 of the main body 17.

A removable frictional cap 60 is placed over the end 62 of the main body 17 of the microscope. The cap 60 has a viewing opening 64 in flange 65 through which the Brownian phenomena may be observed substantially along the longitudinal axis of the viewing instrument.

The instrument may be readily assembled and disassembled. The ocular lens 50, washer 56, snap ring 58 may be assembled or disassembled, as for cleaning and the like, through the end 62 of the main body. The frictional cap may be telescoped on or removed from said end 62.

The objective lens construction 40, and washers 36 and 42 may be assembled and disassembled through the threaded end 30 of the main body, with the plug 26 being threadedly removed or inserted, as the case may be.

The tube 16, lens 18 and cap 24 may be assembled or disassembled by frictional sliding action.

In this manner all of the parts or components may be assembled for use and disassembled for cleaning or repair as required.

To prepare the instrument 10 for use, the adjustable tube 16 is removed from the end of the microscope body 17 and held with the open end 66 down while smoke from an extinguished match, or piece of punk, is allowed to enter. The chamber is then telescoped back onto the microscope and the assembled viewing instrument pointed, objective end 15 forward, at any strong light source such as sunlight, or a nearby lamp bulb.

The sample chamber 12, 14 is then slidably adjusted until the minute particles of smoke come into focus at the conjunction 52 of the converging light rays. The view is of thousands of bright particles, all in jittery, or erratic motion. This motion is representative of the actual motion of the air molecules in the chamber. The air molecules themselves cannot be seen since they are so small; however, they collide constantly with the larger smoke particles and transfer energy to them. This results in a somewhat slower movement of the smoke particles since their mass is greater.

An advantage gained in this instrument is the prevention of the effect of convection currents on the viewing field. The chamber is sealed to air currents, so that a "cloud" of smoke particles does not stream across the focus point so rapidly that observation of an individual particle is impossible. A substantially dormant condition of the smoke mass is obtained. This is accomplished by reducing the size of the chamber 12, 14 in the area 12 of the focus point 52 substantially to the minimum possible size and still allow the converging light rays to reach the focus point 52. This has been accomplished by extending the objective end 15 of the microscope down almost to the condensing lens 18. Thus, the focus point 52 is always within the reduced area but the converging light can still enter. This condition has been obtained by reducing the inside diameter of the wall of the sample chamber in the area 12, as indicated.

For a given size, a transparent sphere is a most powerful refractive type condensing lens. A sphere is a much less expensive optical lens to manufacture than, say, a hemisphere, and has one-half its focal length. Of course, the shorter the focal length, as used in this invention, the more intense will be the condensed light. In this invention, a great amount of light is directed on the smoke particles even with the use of the instrument with ordinary light sources.

According to this invention, this light is not trained directly into the objective lens as is the case with ordinary microscope viewing. The minute smoke particles would be lost in the glare of ordinary lighting. For this reason a method is used which produces a dark field while the smoke particles are illuminated by oblique or indirect light which does not directly enter the objective lens of the microscope, and yet causes the smoke particles to stand out in illuminated condition against the dark background field which is produced.

A simple and inexpensive dark field illumination has been produced by painting or masking out the central portion 20 of the spherical condensing lens 18. The light rays enter the sphere in an annular illuminated area 67 and converge at their normal focal point 52. The light rays thus are bounded by two cone-shaped limits 68 and 70 which form two cones of illumination with their apexes touching at the focal point 52. Outside and inside of these cone-shaped limits 68 and 70 there are produced conical dark-fields 72 and 74 respectively. The inner conical field 74 is the dark field against which the bright smoke particles are viewed. This method of condensing and directing the light rays on a common axis with the microscope proper results in a compact and efficient viewing system.

The optical instrument 10 has therewith an integral sealed and adjustable chamber 12, 14 for viewing the Brownian movements. The chamber has the restricted area 12 for the elimination of convection currents. The condensing lens 18 is an efficient means for concentrating the light rays in the sample chamber 12, 14. The lens 18 produces a dark field 74 for illuminating a sample in front of said dark field. A dark field light ray condensing system has been provided by the refractive element or spherical lens 18 which is partially blocked off at 20 to prevent light from entering its central portion to produce the dark field condensing system.

A combination 10 has been provided which has a microscope with an objective field 15. A viewing chamber 12, 14 has been provided around the objective field and a refractive and/or spherical element 18 has been provided and blocked off at 20 to prevent light rays from entering its central portion 20 to produce the conical dark field 74 and an object and conical illuminating field 68, 70 adjacent the focus 52 and adjacent the objective field 15.

Also a method of viewing Brownian movements according to this invention provides a gas chamber 12, 14 which contains a gaseous medium, such as air, with small particles suspended therein, such as smoke particles, and which is placed in the objective field 15 of the microscope, and in which chamber light rays 67 are concentrated axially of the microscope to form a dark conical field background 74 and an oblique or conical illuminating field 68, 70. The light rays may be concentrated by a clear transparent sphere 18 with a central portion 20 of said sphere 18 blocked off.

Thus, it is to be seen that I have provided a relatively simple, inexpensive instrument and method which are efficient and effective in viewing Brownian movements and the like.

While the form of the invention now preferred has been disclosed, as required by statute, other forms may be used, all coming within the scope of the claims which follow.

I claim:
1. In combination: a straight microscope tube having a viewing end and a plug holding end; a microscope ocular lens construction in said viewing end of said tube and an objective lens construction in said plug holding end with a line of vision substantially coaxial with said tube; a sample chamber forming plug removably secured in said plug holding end adjacent said objective lens construction and providing a relatively long and confined sample chamber in said plug with end openings at each end of said plug in said line of vision; a straight illuminating lens holding tube having one end longitudinally adjustably telescoping over said microscope tube and plug; a spherical illuminating lens held adjacent the other end of said lens holding tube aligned with said line of vision with a spherical segment shaped central blacked out area producing member adhered on the outer and far surface of said spherical lens and having a light admitting area surrounding said blacked out area, said areas being focused by said spherical lens within said sample chamber to form a dark field in said line of vision with the light rays being trained at a large angle with respect to said line of vision to illuminate large portions of areas of floating particles which are directed toward said viewing end.

2. A combination according to claim 1 in which said illuminating lens holding tube is cylindrical substantially throughout its length and is readily removable from and connectable with said microscopic tube for the insertion of a viewable sample in said lens holding tube.

3. In combination: a straight cylindrical microscope tube having a viewing end and a plug holding end; said tube having an enlarged cylindrical ocular lens receiving chamber at said viewing end with an inward shoulder with an ocular lens construction in said cylindrical chamber held in place by a snap ring against said shoulder, said ocular lens construction and snap ring being readily removable out of said viewing end; said tube having an enlarged plug and objective lens receiving chamber with an inward shoulder and an internal plug receiving thread at said plug end; an objective lens construction in said last-named receiving chamber against said last-named shoulder and a sample chamber forming plug threadedly secured in said plug receiving thread, said plug holding said objective lens against said shoulder, said sample chamber being an axial cylindrical chamber in said plug with a relatively small end adjacent said objective lens, said plug having an extension beyond said plug holding end with an elastic seal ring in said extension; a straight, cylindrical illuminating lens holding tube having one end longitudinally slidably adjustably telescoping over said plug holding end and forming a slidable seal with said elastic seal ring; an illuminating spherical lens engaging a bevel surface on the inside of the other end of said illuminating lens holding tube with an exposed spherical part of said spherical lens extending beyond said last-named other end; a spherical segment shaped blacking out means curvingly adhered on a central portion of said exposed spherical part; and a removable cap frictionally surrounding said last-named other end of said last-named tube, said cap having an inward flange engaging said exposed spherical part in spaced relation to said blacking out means to form an annular illuminating area through which light rays enter said spherical lens, pass through said spherical lens and converge at a focal point inside said sample chamber in said plug.

4. A combination according to claim 3 in which another removable cap frictionally surrounds said viewing end and has an inward flange forming a reduced area viewing opening.

5. In combination: a straight cylindrical microscope tube having a viewing end and a plug holding end; said tube having an ocular lens receiving chamber at said viewing end with an ocular lens construction held in said chamber and being readily removable out of said viewing end; said tube having a plug and objective lens receiving chamber with an objective lens construction and with a sample chamber forming plug held in said last-named chamber, said objective lens construction and said plug being readily removable out of said plug holding end, said sample chamber being formed in said plug with a relatively small opening at one end adjacent said objective lens construction and with a relatively large opening at the other end of said plug; a straight cylindrical illuminating lens holding tube having one end longitudinally slidably adjustably telescoping over said plug holding end; an illuminating spherical lens engaging the other end of said lens holding tube with an exposed spherical part of said spherical lens extending beyond said last-named other end; spherical segment shaped blacking out means curvingly adhered on a central portion of said exposed spherical part; and a removable cap frictionally surrounding said last-named other end of said last-named tube, said cap having an inward flange engaging said exposed spherical part in spaced relation to said blacking out means to form an annular illuminating area through which light rays enter said spherical lens, pass through said spherical lens and converge at a focal point inside said sample chamber in said plug.

References Cited by the Examiner

UNITED STATES PATENTS

| | | | |
|---|---|---|---|
| 1,205,837 | 11/16 | Baldwin | 88—14 |
| 2,129,527 | 9/38 | Fassin | 88—14 |
| 2,638,551 | 5/53 | Landsverk et al. | 88—39 X |
| 2,690,695 | 10/54 | Coates | 88—14 |
| 2,732,753 | 1/56 | O'Konski | 88—14 |
| 2,812,686 | 11/57 | Sinclair | 88—14 |
| 2,870,674 | 1/59 | Mize | 88—39 |

FOREIGN PATENTS

| | | |
|---|---|---|
| 596,683 | 8/25 | France. |
| 675,911 | 5/39 | Germany. |
| 396,325 | 8/33 | Great Britain. |

DAVID H. RUBIN, *Primary Examiner.*